US012734687B1

(12) United States Patent
Sachar et al.

(10) Patent No.: US 12,734,687 B1
(45) Date of Patent: Sep. 15, 2026

(54) SWING ANOMALY DETECTION FOR ROBOTIC MANIPULATION OF OBJECTS

(71) Applicant: Amazon Technologies, Inc., Seattle, WA (US)

(72) Inventors: Avnish Sachar, Watertown, MA (US); Lixuan Luo, Seattle, WA (US); Dhruv Kool Rajamani, Washington, DC (US); Azarakhsh Keipour, Midlothian, VA (US); Sicong Zhao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/978,595

(22) Filed: Dec. 12, 2024

(51) Int. Cl.
*B25J 9/16* (2006.01)

(52) U.S. Cl.
CPC ............ *B25J 9/163* (2013.01); *B25J 9/1664* (2013.01); *B25J 9/1674* (2013.01); *B25J 9/1697* (2013.01)

(58) Field of Classification Search
CPC ........ B25J 9/163; B25J 9/1664; B25J 9/1674; B25J 9/1697
See application file for complete search history.

(56) References Cited

U.S. PATENT DOCUMENTS 8,194,971 B2 * 6/2012 Kim ........................ G06T 7/251 382/104
9,626,566 B2 * 4/2017 Versace .................. B25J 9/1697
2004/0002642 A1 * 1/2004 Dekel ....................... G06T 7/74 600/407
2011/0243390 A1 * 10/2011 Eggert .................... G06T 7/269 382/107
2014/0205146 A1 * 7/2014 Holz ......................... G06T 7/70 382/103
2015/0302576 A1 * 10/2015 Holz ....................... G06T 7/536 382/103
2024/0199349 A1 * 6/2024 Deshpande .......... B65G 47/905
2025/0153944 A1 * 5/2025 Cohen .................. B65G 47/917
2025/0381675 A1 * 12/2025 Bocamazo ............ B25J 9/1697

* cited by examiner

*Primary Examiner* — Robert T Nguyen

(74) *Attorney, Agent, or Firm* — Kilpatrick Townsend & Stockton LLP

(57) ABSTRACT

Techniques described herein relate to swing anomaly detection for objects transferred via robotic manipulation. For example, a computer system can generate, based on first sensor data of a robotic manipulator manipulating an object and by using a machine learning model, a first segmentation of the object represented by the first sensor data. The first sensor data can be received at a first time. The computer system can generate, based on second sensor data of the robotic manipulator manipulating the object and by using the machine learning model, a second segmentation of the object represented by the second sensor data. The computer system can generate, by comparing the first segmentation and the second segmentation, a swinging score indicating swinging of the object by the robotic manipulator. A motion plan for the robotic manipulator can be updated based on the swinging score.

20 Claims, 8 Drawing Sheets

GENERATE, BASED AT LEAST IN PART ON FIRST SENSOR DATA OF A ROBOTIC MANIPULATOR MANIPULATING AN OBJECT AND BY AT LEAST USING A MACHINE LEARNING MODEL, A FIRST SEGMENTATION OF THE OBJECT IN THE FIRST SENSOR DATA, THE FIRST SENSOR DATA BEING RECEIVED AT A FIRST TIME 702

GENERATE, BASED AT LEAST IN PART ON SECOND SENSOR DATA OF THE ROBOTIC MANIPULATOR MANIPULATING THE OBJECT AND BY AT LEAST USING THE MACHINE LEARNING MODEL, A SECOND SEGMENTATION OF THE OBJECT IN THE SECOND SENSOR DATA, THE SECOND SENSOR DATA BEING RECEIVED AT A SECOND TIME SUBSEQUENT TO THE FIRST TIME 704

GENERATE, BASED AT LEAST IN PART ON A COMPARISON OF THE FIRST SEGMENTATION AND THE SECOND SEGMENTATION, A SWINGING SCORE INDICATING SWINGING OF THE OBJECT BY THE ROBOTIC MANIPULATOR 706

UPDATE A MOTION PLAN FOR THE ROBOTIC MANIPULATOR MANIPULATING THE OBJECT BASED AT LEAST IN PART ON THE SWINGING SCORE 708

FIG. 7

SWING ANOMALY DETECTION FOR ROBOTIC MANIPULATION OF OBJECTS

BACKGROUND

Many modern-day industries are relying more and more on robotic manipulators. Such robotic manipulators may function to increase repeatability of tasks, increase efficiency of production lines, and bring other benefits to their operators. For instance, robotic manipulators may be used in modern inventory systems, such as those in mail order warehouses, supply chain distribution centers, airport luggage systems, or custom-order manufacturing facilities.

BRIEF DESCRIPTION OF THE DRAWINGS

Various embodiments in accordance with the present disclosure will be described with reference to the drawings, in which:

FIG. 7 illustrates a flowchart showing an example process for swing anomaly detection for robotic manipulation of objects, according to some embodiments.

DETAILED DESCRIPTION

Figure 1:
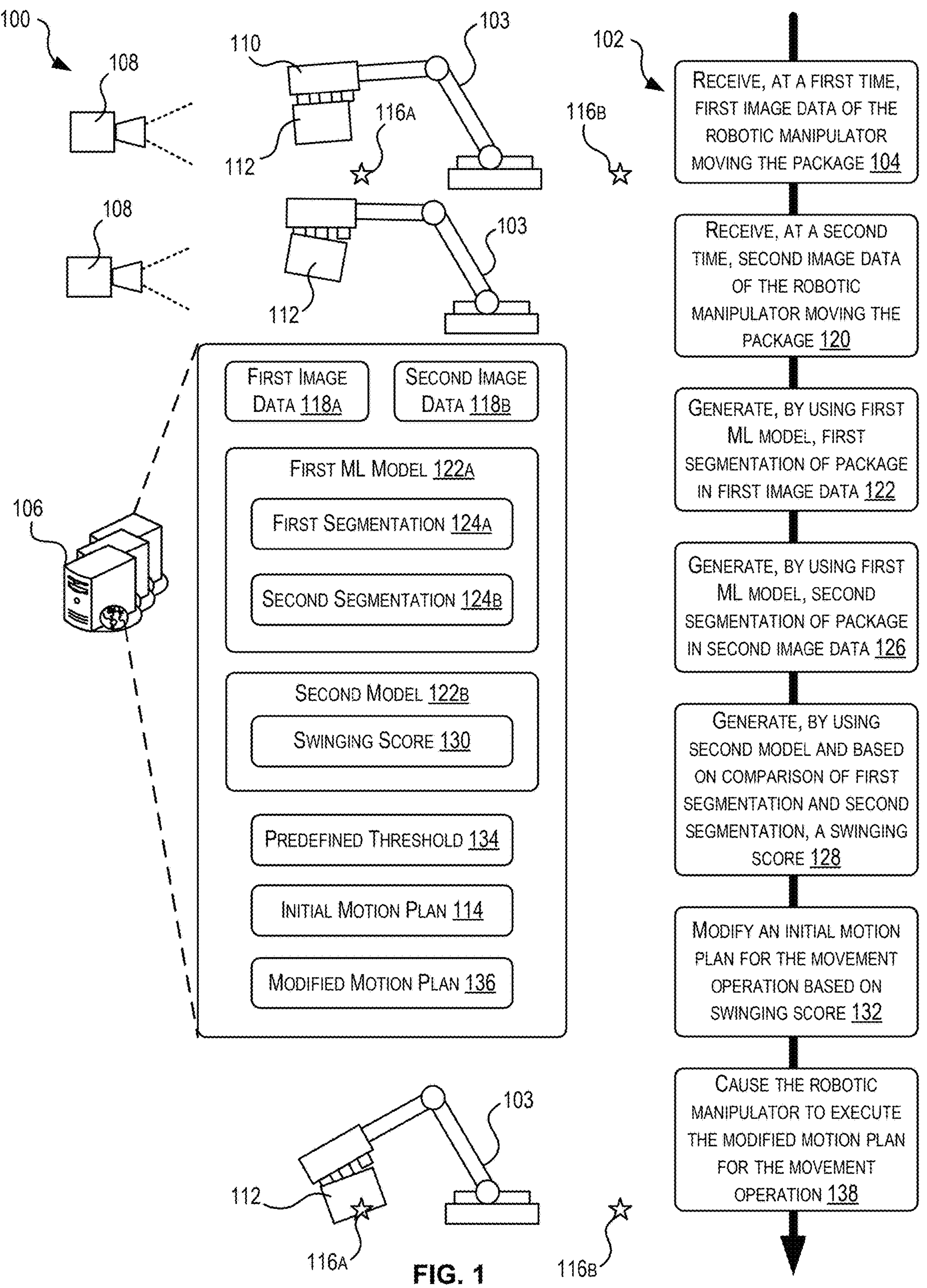
FIG. 1 illustrates a block diagram of a system and a flowchart showing an example process for swing anomaly detection for robotic manipulation of packages, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, swing anomaly detection for objects being manipulated by robotic manipulators. For example, an inventory system may include robotic manipulators that manipulate the position of objects. Motion plans generated for robotic manipulators moving or otherwise manipulating objects may typically assume that the object is stationary. But in some cases, objects grasped by a robotic manipulator may swing, which can potentially result in misplacement or damage to the object. Thus, to account for object swing, sensor data captured throughout movement of the object by the robotic manipulator can be used to determine whether the object is swinging and the degree to which swinging may be occurring. For example, segmentation techniques can use the sensor data to identify segmentation of the object at multiple times while the object is swinging. These segmentations may then be used to score the degree of object swinging. Depending on the swinging score, the motion plan for the robotic manipulator may be adjusted to compensate for the swinging.

In a particular example, an inventory system can include a conveyor that can transport packages (e.g., boxes or bagged items) to a robotic manipulator. The robotic manipulator can perform movement operations that can involve grasping a package on the conveyor, lifting the package, and transferring the package to another location, such as into a cart, a bin, a tote, etc. Placement of the package into the cart may be precisely controlled (e.g., via a motion plan executed by the robotic manipulator) to prevent damage to the package or misplacement of the package. But the motion plan may not account for swinging of the package, which may occur if the package is not securely grasped by the robotic manipulator. In some instances, severe swinging may even result in the package being dropped by the robotic manipulator.

To quickly detect and mitigate package swinging, image data capturing the robotic manipulator moving the package may be captured by one or more sensors. A set of models can be used to compare the image data representing the robotic manipulator and the package. Successive images can be segmented to identify package position. Segmented positions of the package in the first image and second image can be aligned and compared to determine an area of intersection. The comparisons can be used to generate a swinging score indicating a degree of swinging exhibited by the package over time. In some examples, relatively low swinging scores (e.g., indicating a relatively low area of intersection between aligned segmentations) may indicate a high amount of unintended motion of the package between the successive images, and thus may indicate swinging of the package. If the swinging score is below a predefined threshold, the motion plan for the robotic manipulator may be updated. For instance, the robotic manipulator may complete the movement operation at a slower speed or may place the package back at its starting location and attempt to transfer the package by grasping at a different orientation (e.g., different face of the package). Moving the package at a slower speed or grasping a different face of the package may, in some examples, provide a more secure grasp that may result in less swinging of the package.

Embodiments of the present disclosure may provide additional technological advantages over conventional techniques for transfer of objects using robotic manipulation. For instance, conventional techniques for enhancing robotic manipulation often focus on generating high-quality grasps to provide the highest probability of success for a manipulation operation. But once a grasp of an object has been attempted, issues such as unsuccessful grasping and dropping the object during the manipulation operation may arise. Further, conventional techniques for detecting or predicting swinging of objects in robotic manipulation may involve force sensing, which may involve difficult or complicated modifications to a robotic manipulator. Other conventional techniques, such as using optical flow to estimate object movements, particle filters to track appearance or motion dynamics of an object, or deep learning techniques to detect deformations or swinging motions, temporal information from tactile sensors for estimating orientation of grasped objects (e.g., evaluated using neural networks with long short-term memory (LSTM) layers, may introduce challenges such as achieving real-time performance, robust tracking under complex lighting or occlusions, or generalizing to diverse swinging objects. For instance, methods requiring a large number of feature points may result in detection delays. Variations in lighting or partial visibility of objects may drastically affect accuracy.

In contrast, embodiments described herein utilize vision-based solutions that detect and mitigate manipulation operations demonstrating undesired effects, such as swinging of objects. Models (e.g., machine learning models or algorithmic models) can be used to identify anomalies in a manipulation operation by comparing successive image data to identify swinging. Thus, a low-quality manipulation operation can be quickly and accurately mitigated in real time. Detecting low-quality manipulation operations in which objects swing can significantly impact the efficiency of an inventory system by preventing damage to objects or equipment or by keeping track of inadvertently manipulated objects. Embodiments described herein are therefore more efficient than conventional techniques for controlling robotic manipulation of objects. Further, techniques described herein, such as adjustments to motion plans for robotic manipulators, can be implemented in real-time or near real-time, which may not be possible for conventional techniques that are more computationally expensive. In some examples, embodiments described herein may accurately detect swinging of objects using only image data from one or more image sensors, without involving additional types of sensing or hardware modifications to the robotic manipulator.

In the interest of clarity of explanation, embodiments may be described herein in connection with an inventory system, inventory items (e.g., items associated with an inventory, such as packages), and operations related to an inventory. However, the embodiments are not limited as such. Instead, the embodiments may similarly apply to a manufacturing system, supply chain distribution center, airport luggage system, or other systems using robotic manipulators to perform various automated and, in some instances, autonomous operations. Further, while embodiments may be described herein in connection with using a robotic manipulator to move objects from one location to another location, the embodiments may similarly apply to any manipulation of the position of objects by a robotic manipulator.

Turning now to the figures, FIG. 1 illustrates a block diagram of a system 100 and a flowchart showing an example process 102 for swing anomaly detection for robotic manipulation of objects, according to some embodiments. The system 100 can include devices, objects, and the like that correspond to the process 102. For example, the system 100 can include a robotic manipulator 103 and one or more image sensors 108 that can capture image data corresponding to the robotic manipulator 103. The process 102 can be performed by the computing system 106 and/or the computer system 802 of FIG. 9.

FIGS. 1 and 7 illustrate example flow diagrams showing respective processes 102 and 800 as described herein. The processes 102 and 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 102 or 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 can start at block 104, in which the computing system 106 can receive, from an image sensor 108 at a first time, first image data **118*a* representing a robotic manipulator 103 moving a package 112 from a first location 116*a* to a second location 116*b* as part of a movement operation. For example, the first location 116*a* may be a conveyor transporting packages to the robotic manipulator 103. The second location 116*b* may be a bin into which packages are deposited by the robotic manipulator 103. In other examples, the package 112 may be transported between any suitable combination of locations. The package 112 may be, for example, a box, a bag, or any suitable packaging material housing items within the package 112. The first image data 118*a* may be image data, such as red-green-blue (RGB) image data, which depicts the robotic manipulator 103 grasping the package 112. The robotic manipulator 103 depicted in FIG. 1 may have an end-of-arm tool 110 that is a suction grasper. The end-of-arm tool 110 may use suction to grasp the package 112, thus allowing the robotic manipulator 103 to lift, transfer, and release the package 112 from the first location 116*a* to the second location 116*b***.

At block 120, the computing system 106 can receive, from the image sensor at a second time subsequent to the first time, second image data **118*b* representing the robotic manipulator 103 moving the package 112 toward the second location 116*b* as part of the movement operation. For example, the first time and the second time may be separated by one second (or any other suitable time period). In some examples, the second image data 118*b* may be the next image frame captured after the first image data 118*a* (e.g., first image frame). Thus, the second image data 118*b* may show progression of the movement operation as the robotic manipulator 103 from the first image data 118*a*. In some examples, the positioning of the package 112 with respect to the robotic manipulator 103 may not be stationary as the package 112 is being transferred to the second location 116*b*. For example, as depicted in FIG. 1, the package 112 may swing during the movement operation. The swinging may, in some examples, be caused by an unusual shape of the package, a suction failure of a portion of the end-of-arm tool 110, high movement speeds of the robotic manipulator 103**, etc.

At block 122, the computing system 106 can generate, by at least using a first machine learning model **122*a*, a first segmentation 124*a* of the package 112 in the first image data 118*a*. The first machine learning model 122*a* may be a segmentation model that can be trained to segment (e.g., generate a bounding box around) objects such as the package 112 in image data, without segmenting other features in the image data. In some examples, the first machine learning model 122***a* may perform instance segmentation or semantic segmentation, which can identify the boundary of the object to yield a list of points that form a polygon or binary mask. In some examples, the first segmentation 124*a* may additionally include a segmentation of the pose of the robotic manipulator 103 grasping the package 112 at the first time.

At block 126, the computing system 106 can generate, by at least using the first machine learning model 122*a*, a second segmentation 124*b* of the package 112 in the second image data 118*b*. The second segmentation 124*b* may outline the boundaries of the package 112 at the second time (e.g., after the first time). In some examples, the second segmentation 124*b* may additionally include a segmentation of the pose of the robotic manipulator 103 grasping the package 112 at the second time.

At block 128, the computing system 106 can generate, by at least using a second model 122*b* and based at least in part on a comparison of the first segmentation 124*a* and the second segmentation 124*b*, a swinging score 130 indicating swinging of the package 112 by the robotic manipulator 103 during the movement operation. The second model 122*b* may be a machine learning model, an algorithm, or any other suitable model, algorithm, module, etc. The second model 122*b* may align the first segmentation 124*a* and the second segmentation 124*b* according to a detected pose of the robotic manipulator 103 to then determine the swinging score 130.

For example, the second model 122*b* may compute camera poses of the image sensor 108 relative to the end-of-arm tool 110. Using the computed poses, the second model 122*b* may apply a transformation matrix (e.g., a homography transformation matrix) from the first segmentation 124*a* to the second segmentation 124*b* can be applied to the first segmentation 124*a*. The second model 122*b* can then determine the swinging score 130, such as an image over intersection (IoU) metric, of the transformed first segmentation 124*a* and the second segmentation 124*b*. In other examples, any suitable metric that can indicate similarity between the first segmentation 124*a* and the second segmentation 124*b* can be used. If the swinging score 130 is below a predefined threshold (e.g., $T_{swing}$), the package 112 can be detected as swinging. If the package 112 is dynamic (e.g., swinging), the swinging score 130 may be relatively low due to poor overlap of segmentation masks. In the example depicted in FIG. 1, the second model 122*b* may determine a swinging score 130 that indicates that the package 112 is swinging due to being below the predefined threshold.

At block 132, the computing system 106 can modify an initial motion plan 114 for the movement operation to define a modified motion plan 136 based at least in part on the swinging score 130. For example, if the swinging score 130 is above the predefined threshold, the package 112 may not be swinging, and the movement operation can continue without modification to the initial motion plan 114. In other examples, the swinging score 130 may be below the predefined threshold, resulting in a modification to the initial motion plan 114. In some examples, the modified motion plan 136 can involve a change in movement speed by the robotic manipulator 103. For example, the initial motion plan 114 can involve the robotic manipulator 103 moving the package 112 at a first speed. The modified motion plan 136 can involve the robotic manipulator 103 moving the package 112 at a second speed, which may be slower than the first speed. The slower speed may aid in reducing swinging of the package 112. In another example, the swinging score 130 may indicate that the swinging of the package 112 is severe enough to warrant termination of the movement operation. Thus, the modified motion plan 136 may involve causing the robotic manipulator 103 to drop the package 112 and/or deposit the package 112 back at the first location 116*a*. The package 112 may therefore be moved to the second location 112*b* via other (e.g., non-robotic) means.

In the example depicted in FIG. 1, the modified motion plan 136 may involve changing how the robotic manipulator grasps the package 112. For example, at block 138, the computing system 106 can cause the robotic manipulator 103 to execute the modified motion plan 136 for the movement operation. The modified motion plan 136 may involve returning the package 112 to the first location 116*a*, changing an orientation of the package 112, and grasping the package 112 at the new orientation (e.g., suctioning onto a different face of the package 112). Suctioning a different face of the package 112 may, in some examples, result in a more secure grasp of the package 112, which can reduce swinging of the package 112 during transfer from the first location 116*a* to the second location 116*b*. In some examples, success or failure of the modified motion plan 136 can be used to update (e.g., retrain) the second model 122*b* to improve accuracy in generating swinging scores for future grasps.

Figure 2:
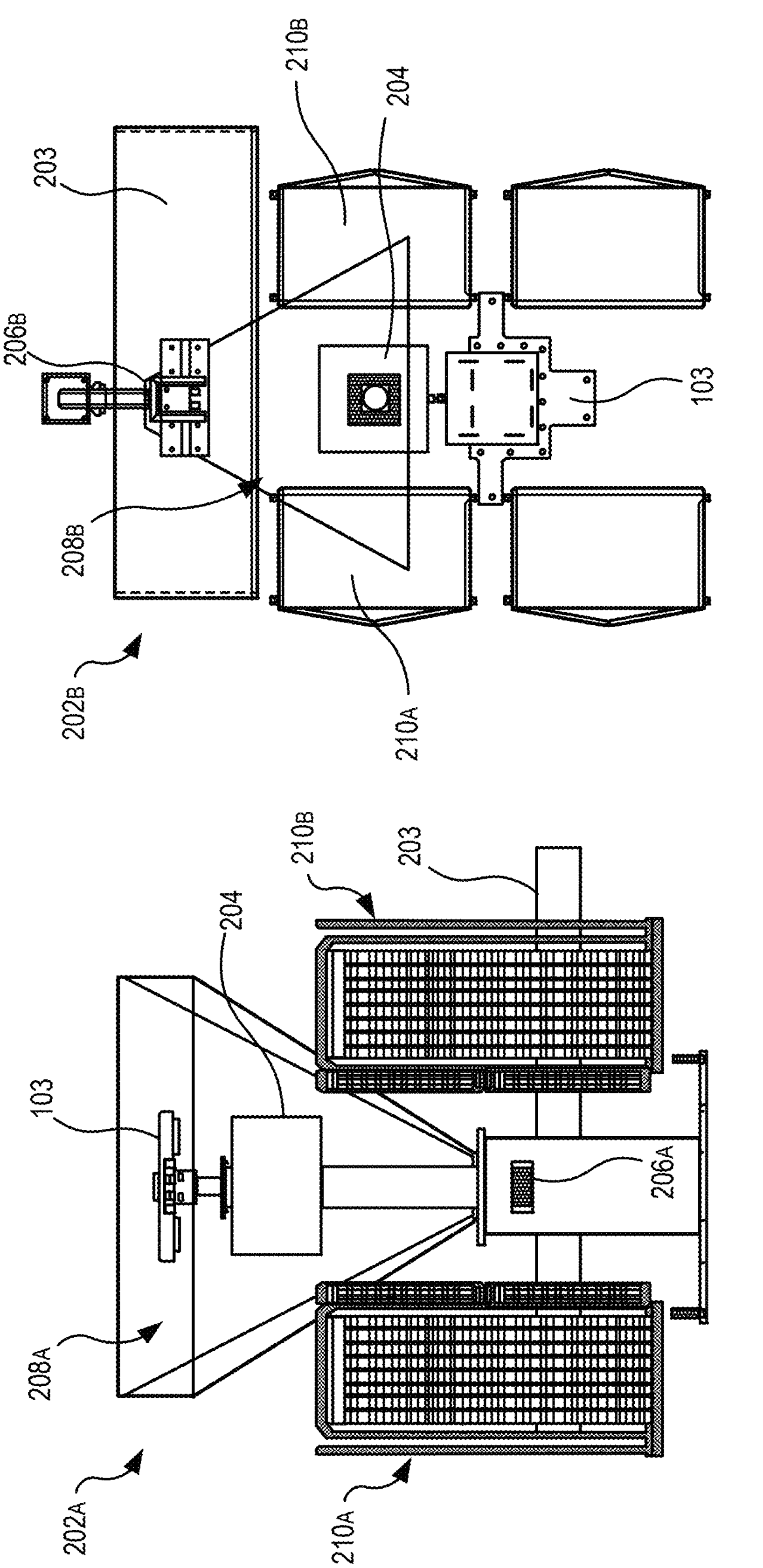
FIG. 2 illustrates an example diagram of two sensor orientations for swing anomaly detection for robotic manipulation of objects, according to some embodiments.

FIG. 2 illustrates an example diagram of two sensor orientations 202*a-b* for swing anomaly detection for robotic manipulation of objects, according to some embodiments. In some examples, it may be beneficial to detect sensor data of an object manipulation operation from multiple sensors (e.g., from multiple perspectives). For example, a swing of an object may be detectable from one sensor orientation but not another.

The first orientation 202*a* shows a front-facing view of a robotic workstation including a robotic manipulator 103. Objects, such as object 204, may travel down a conveyor 203 toward the robotic manipulator 103. The robotic manipulator 103 may grasp the object 204 from the conveyor 203 and, after grasping, may transfer the object 204 into one of the bins 210*a-b* in the workstation. For the first orientation 202*a*, a first sensor 206*a* can be positioned beneath a movement path of an object 204 that is being transferred by the robotic manipulator 103, such as from the conveyor 203 to a second bin 210*b*. The first sensor 206*a* can capture sensor data (e.g., image data or point-cloud data) within a first sensing region 208*a*. The first sensing region 208*a* can capture a bottom face of the object 204 as the object 204 is transferred.

Figure 3:
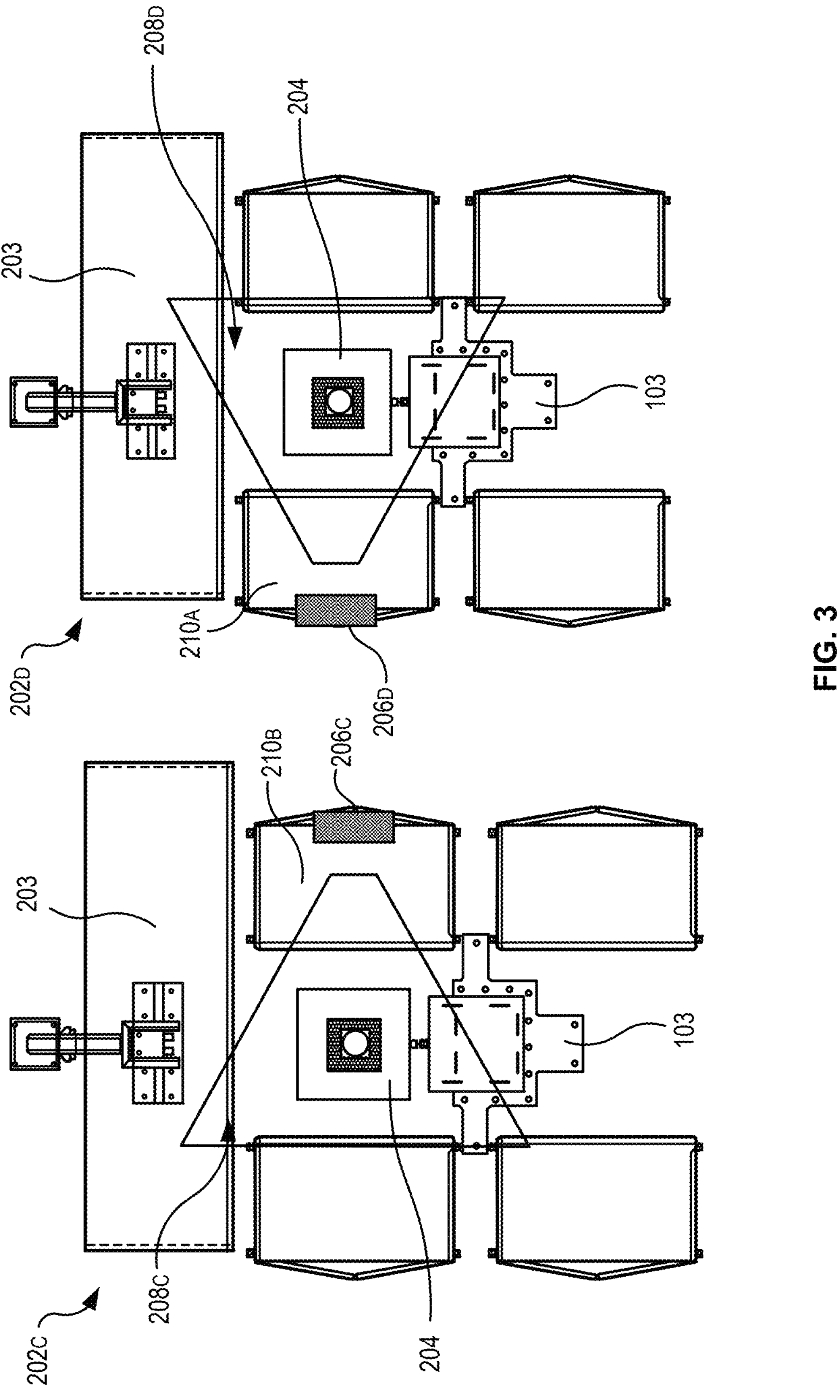
FIG. 3 illustrates another example diagram of two sensor orientations for swing anomaly detection for robotic manipulation of objects, according to some embodiments.

The second orientation 202*b* can be a top-down view of the robotic workstation. For the second orientation 202*b*, a second sensor 206*b* can be positioned in-line with a base of the robotic manipulator 103 to detect another face of the object 204 (e.g., within second sensing region 208*b*). FIG. 3 illustrates additional sensor orientations, including third sensor 206*c* positioned on the second bin 210*b* with a third sensing region 208*c*, and fourth sensor 206*d* positioned on the first bin 210*a* with a fourth sensing region 208*d*. The third sensor orientation 202*c* and the fourth sensor orientation 202*d* can also be top-down views of the robotic workstation. In some examples, the sensors 206*a-d* can detect sensor data at the same time.

Figure 4:
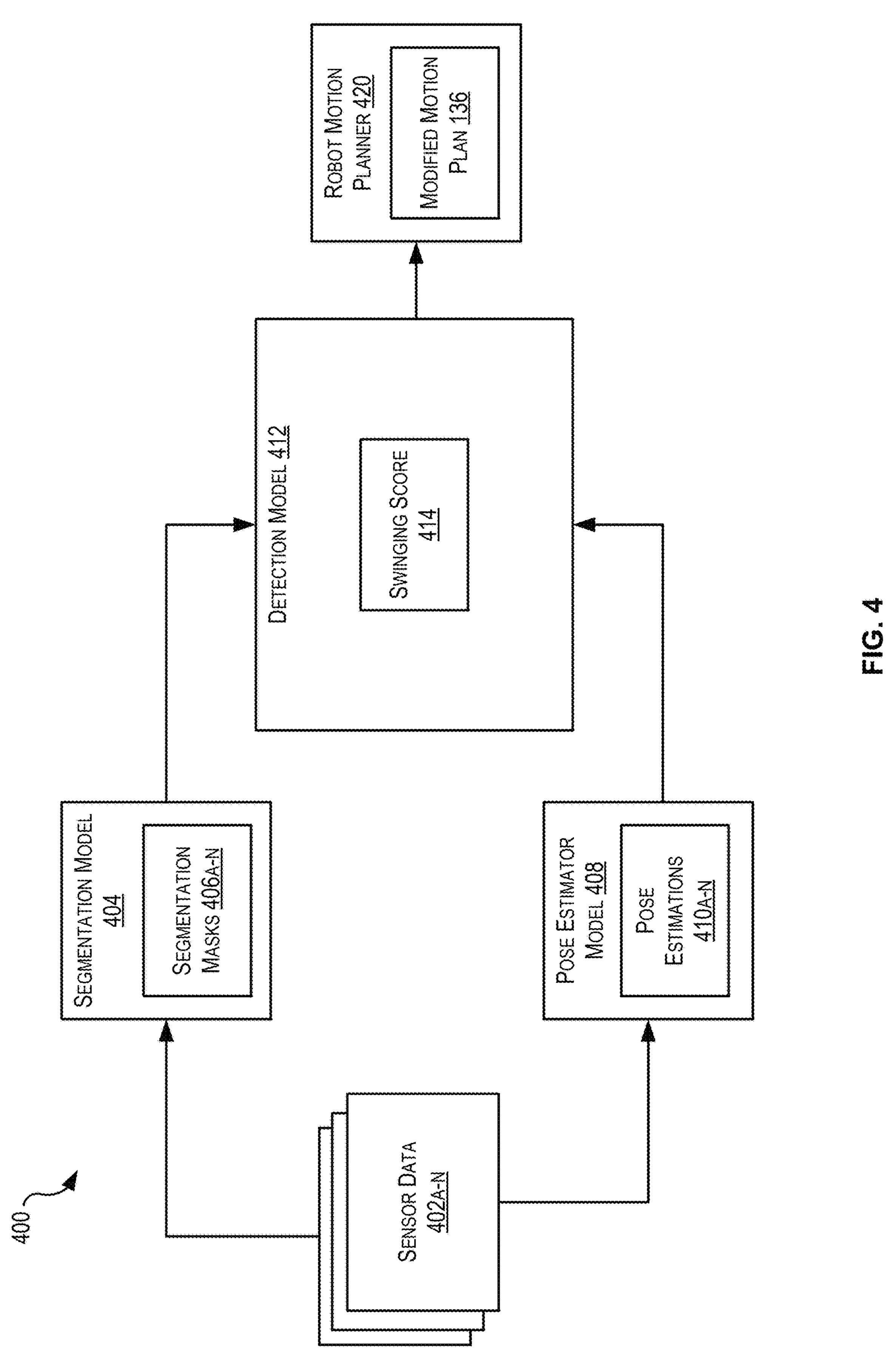
FIG. 4 illustrates a block diagram of an example computing system for swing anomaly detection for robotic manipulation of objects, according to some embodiments.

FIG. 4 illustrates a block diagram of an example system 400 for swing anomaly detection for robotic manipulation of objects, according to some embodiments. The system 400 can include a segmentation model 404, a pose estimator model 408, and a detection model 412 that can be used to generate a swinging score 414 based on sensor data 402*a-n*. The system 400 can additionally include a robot motion planner 420 that can generate modified motion plans 136 based on the outputs of the detection model 412. The system 400 can be executed by the computing system 106 of FIG. 1 and/or the computer system 802 of FIG. 8.

The sensor data 402*a-n* can be successive captures of sensor data, such as image data, from one or more sensors capturing a robotic manipulator that is manipulating objects (e.g., changing orientation of objects, moving objects from one location to another location, etc.). During manipulation operations, objects may swing. Swinging can refer to the uncontrolled motion of an object during or after the object has been grasped by the robotic manipulator, which may cause potential collisions or inaccurate placement of the objects. The system 400 may be used to detect object swinging.

For example, the segmentation model 404 can take the sensor data 402*a-n* as input. The segmentation model 404 can segment each sensor data 402 (e.g., each image) to generate a segmentation mask 406 that outlines or otherwise identifies objects in the sensor data 402*a-n*. The segmentation model 404 can be trained to only segment the objects and, in some examples, the robotic manipulator in the sensor data 402*a-n*. For example, the segmentation model 404 can learn to ignore objects in the background, such as conveyors, and non-package items, such as shipping labels. In some examples, object detection with only a single image may be prone to occasional segmentation errors and/or temporal changes, often resulting in false negatives or positives. For instance, the segmentation model 404 may segment two stacked similar object as a single object; one of the stacked objects may then drop during a transfer operation with some initial images still showing the object. Or, a large foreground object may occlude another smaller object. Thus, capturing sensor data 402*a-n* from multiple sensors positioned at different orientations may thus prevent such segmentation errors or temporal changes.

Figure 5:
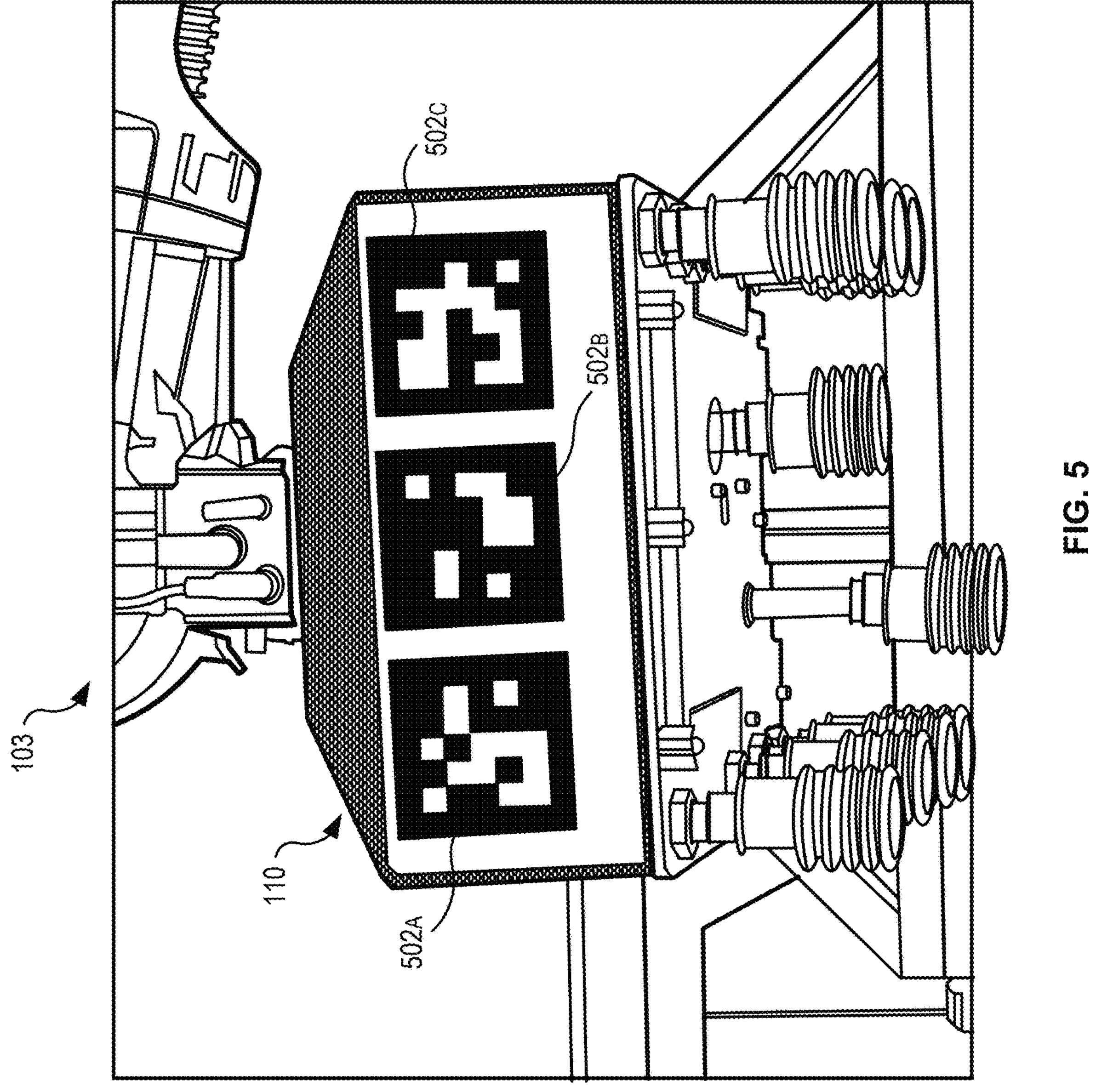
FIG. 5 illustrates example fiducial markers of a robotic manipulator, according to some embodiments.

The pose estimator model 408 can also use the sensor data 402*a-n* to determine pose estimations 410*a-n* of the robotic manipulator for each successive sensor data 402*a-n*. In some examples, pose estimations 410*a-n* can be determined based on fiducial markers on an end-of-arm tool of the robotic manipulator. Fiducial marks can yield both pose and uniqueness of the fiducial markers themselves, thus enabling accurate determination of camera pose relative to the end-of-arm tool. An example of fiducial markers 502*a-c* on an end-of-arm tool 110 of a robotic manipulator 103 are depicted in FIG. 5. In some examples, the fiducial markers 502*a-c* can be QR codes, barcodes, ArUco markers, asymmetric circles, or any other suitable markers that can be detected by a sensor.

Returning now to FIG. 4, the pose estimator model 408 can detect pose estimations 410*a-n* of the end-of-arm tool 110 by tracking the position of the fiducial markers over time. For example, the sensor data 402*a-n* in successive captures (e.g., images) can be aligned by aligning detected fiducial markers. For instance, the pose estimator model 408 can generate a homography matrix by matching corners of fiducial markers (e.g., the twelve corners of the three fiducial markers 502*a-c* of FIG. 5) or, in some examples, matching marker origins (e.g., if using asymmetric circles as fiducial markers) across two successive images of the sensor data 402*a-n*. In some instances, inaccuracies in detecting fiducial markers may warp the sensor data 402. To avoid such inaccuracies, the pose estimator model 408 may apply translation, rotation, and/or scaling to the sensor data 402*a-n* for alignment. The alignment can be done by aligning the diagonal line of the fiducial markers.

To scale the sensor data 402*a-n*, the pose estimator model 408 can determine the length of diagonal lines (e.g., across corners of a set of fiducial markers on the robotic manipulator) for successive images such that the diagonal line for a current image matches the diagonal line for the previous image. The previous image can be scaled by this factor that causes the diagonal lines to match. Translation of the sensor data 402*a-n* can involve finding the center of the diagonal lines for both images. An x and y coordinate translation (e.g., the difference between the coordinates of the center of the diagonal lines) can be applied to the previous image. This can allow the centers of the diagonals for both images to be aligned, along with the diagonals being the same length from the scaling.

Additionally, two-dimensional (2D) rotation can be performed by determining the rotation angle needed to align the diagonal lines of the two images. The rotation angle may be the degree of 2D rotation (with respect to the x-axis and γ-axis of the images) that should be applied to the previous image to completely overlap the two diagonal lines on the two images. This can be done via trigonometry and knowledge of the center and endpoints of the two diagonal lines. The rotation angle can be applied to the previous image while centered on the point found via translation. In some examples, planar rotation can also be performed on the previous image. The planar rotation can be determined to be along the axis of the end-of-arm tool using the degree of the end-of-arm tool with respect to the sensor, as determined from the fiducial markers. Using planar rotation may increase the accuracy or consistency in segmentation alignment. The resulting pose estimation 410*a-n* aligning the sensor data 402*a-n* with the homography matrix via translation, rotation, scaling, and/or planar rotation can be provided as input to the detection model 412.

Figure 6:
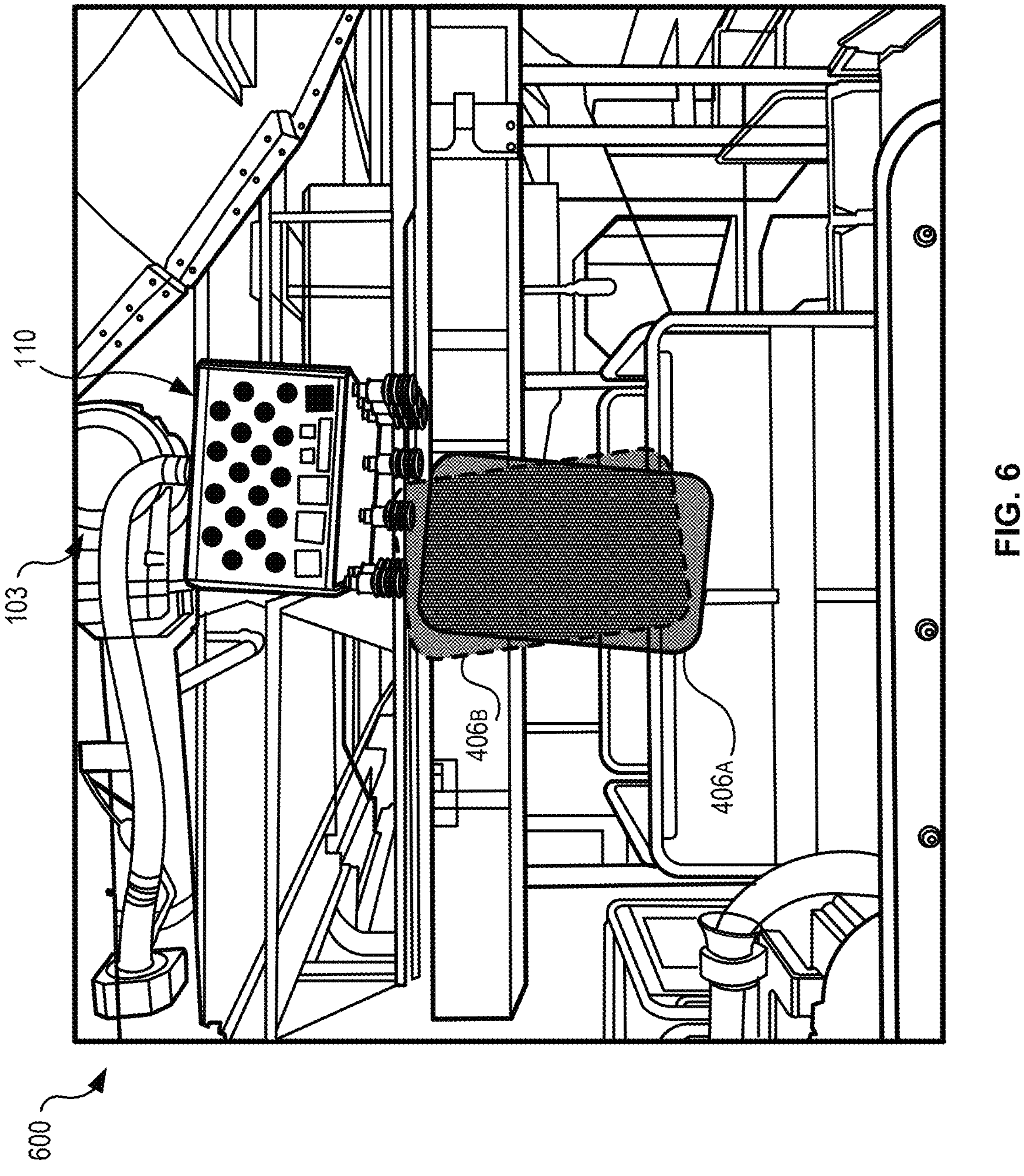
FIG. 6 illustrates example segmented sensor data for swing anomaly detection, according to some embodiments.

By performing translation, rotation, scaling, and/or planar rotation to align the sensor data 402, skewing problems can be eliminated, even when the end-of-arm tool moves nearly parallel to the sensor plane. An example of aligned sensor data 600 is depicted in FIG. 6, which illustrates a first segmentation mask 406*a* from sensor data captured at a first time (e.g., in a first image) and a second segmentation mask 406*b* from sensor data captured at a second time (e.g., in a second image captured after the first image). The aligned sensor data 600 may, in some examples, be aligned based on fiducial markers detected on the end-of-arm tool 110.

Returning now to FIG. 4, successive captures of aligned sensor data (including segmentation masks 406*a-n*) can be used by the detection model 412 to detect anomalies such as swinging. For example, the detection model 412 can generate a swinging score 414 that indicates the area of intersection between successive aligned segmentation masks 406*a-b*. The swinging score 414 for the segmentation masks 406*a-b* in FIG. 6 may be relatively low, indicating swinging, as the second segmentation mask 406*b* may show a significant change in position compared to the first segmentation mask 406*a*. In some examples, an object may be detected as swinging if the swinging score 414 for one or more consecutive pairs of images in the sensor data 402*a-n* is below a swinging threshold, such as 0.80. When the swinging score 414 falls below the swinging threshold, the robot motion planner 420 can generate a modified motion plan 136 for the robotic manipulator to address the swinging. Example modified motion plans 136 can include reducing speed of a movement operation, terminating the movement operation, placing the object back at the starting position and attempting the movement operation again, placing the object back at the starting position and manipulating the object to a different orientation to grasp the object on a different face of the object, or any suitable modification to a motion plan.

In some examples, multiple swinging scores can be used to determine modifications to the motion plan. For instance, multiple sensors positioned at different orientations with respect to the robotic manipulator may each capture sensor data at the same time. For a particular time frame (e.g., a first time and a second time), the detection model 412 may determine a swinging score 414 for the sensor data captured by each sensor. The detection model 412 may determine an average swinging score for the time frame and compare the average swinging score to a predefined threshold to determine whether to adjust the motion plan. An overall low average swinging score may be a reliable indication that there are relatively large changes in segmentation of the object between successive images, and therefore may indicate swinging. Additionally, or alternatively, the detection model 412 may perform a majority vote for each sensor perspective. For example, for a particular time period, if greater than or equal to a predefined amount (e.g., 50%) of swinging scores for all sensors are below a predefined threshold, the detection model 412 may determine that the object is swinging.

FIG. 7 illustrates a flowchart showing an example process 700 for swing anomaly detection for robotic manipulation of objects, according to some embodiments. In some examples, the computing system 106 of FIG. 1 and/or the computer system 802 of FIG. 8 may perform some or all parts of the process 700.

The process 700 may begin at block 702, which can involve generating, based at least in part on first sensor data corresponding to a robotic manipulator manipulating an object and by at least using a machine learning model, a first segmentation of the object represented by the first sensor data. The first sensor data can be received at a first time. The first sensor data may be, in some examples, image data or point-cloud data. In some examples, a first fiducial position of one or more fiducial markers on an end-of-arm tool of the robotic manipulator at the first time can also be detected in the first sensor data. A first pose orientation of the robotic manipulator (e.g., of the end-of-arm tool) at the first time may be determined from the first fiducial position.

At block 704, the process 700 can involve generating, based at least in part on second sensor data corresponding to the robotic manipulator manipulating the object and by at least using the machine learning model, a second segmentation of the object represented by the second sensor data. The second sensor data can be received at a second time subsequent to the first time. The second sensor data may be captured by the same sensor that captured the first sensor data. The second sensor data may be, in some examples, image data or point-cloud data. In some examples, a second fiducial position of the one or more fiducial markers on the end-of-arm tool of the robotic manipulator at the second time can also be detected in the second sensor data. A second pose orientation of the robotic manipulator (e.g., of the end-of-arm tool) at the second time may be determined from the second fiducial position.

At block 706, the process 700 can involve generating, based at least in part on a comparison of the first segmentation and the second segmentation, a swinging score indicating swinging of the object by the robotic manipulator. For example, the first segmentation and the second segmentation may be aligned based at least in part on the first fiducial position and the second fiducial position, and/or based at least in part on the first pose orientation and the second pose orientation. In some examples, aligning the position of the second segmentation with respect to the first segmentation can be performed based at least in part on the first fiducial position and the second fiducial position by performing at least one of scaling, translation, or rotation of the second sensor data with respect to the first sensor data.

The swinging score can be generated based at least in part on the alignment of the first segmentation and the second segmentation. For example, an area of intersection can be determined between the aligned first segmentation and second segmentation. The swinging score may be generated based at least in part on the area of intersection. In some examples, the machine learning model may be a first machine learning model. The swinging score may be generated by a second model, which may be a machine learning model, an algorithm, or any suitable type of model.

In some examples, the swinging score generated from the first sensor data and the second sensor data can be a first swinging score. The first sensor data and the second sensor data may be received from a first sensor that has a first sensor orientation with respect to the robotic manipulator. A second sensor may have a second sensor orientation with respect to the robotic manipulator that differs from the first sensor orientation. Third sensor data and fourth sensor data can be received from the second sensor. The third sensor data can correspond to the robotic manipulator manipulating the object at the first time. The fourth sensor data can correspond to the robotic manipulator manipulating the object at the second time. The third sensor data and the fourth sensor data can be used to generate a second swinging score. Both the first swinging score and the second swinging score can be used to determine whether the object is swinging. For example, if an average of the first swinging score and the second swinging score are below a predefined threshold, the object may be determined to be swinging. Or, if a predefined number of swinging scores from multiple swinging scores are below the predefined threshold, the object may be determined to be swinging.

At block 708, the process 700 can involve updating a motion plan for the robotic manipulator manipulating the object based at least in part on the swinging score. In some examples, updating the motion plan can involve modifying a grasp orientation of the object by the robotic manipulator. In some examples, updating the motion plan can involve modifying an end destination for the object by the robotic manipulator. In some examples, updating the motion plan can involve modifying a movement speed of the robotic manipulator manipulating the object. In some examples, updating the motion plan can involve determining that a value the swinging score is below a predefined threshold. In response to determining that the swinging score is below the predefined threshold, the robotic manipulator may be prevented from performing further manipulation of the object. For example, manipulation of the object may be terminated. In some examples, the robotic manipulator can be automatically caused to perform the modified motion plan. Subsequent to updating the motion plan (e.g., to generate the modified motion plan), a success or a failure of the manipulation of the object can be determined. In some examples, the second model may be updated and/or retrained based on the success or the failure.

Figure 8:
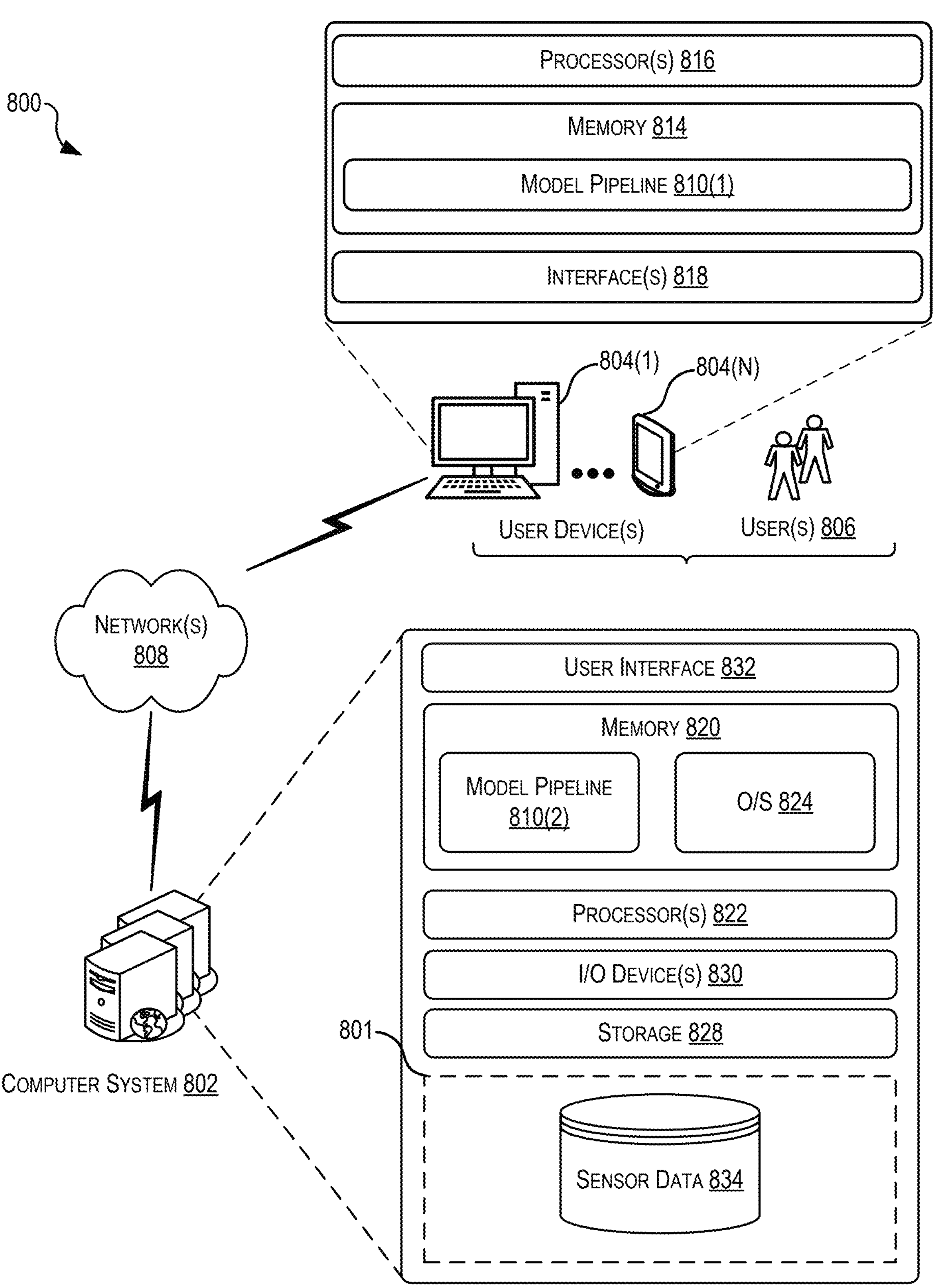
FIG. 8 illustrates an environment in which various embodiments can be implemented.

FIG. 8 illustrates an example schematic architecture 800 for implementing techniques related to swing anomaly detection for robotic manipulation of objects, according to embodiments of the present disclosure. The architecture 800 may include a computer system 802 (e.g., the computing system 106 described herein) in communication with one or more user devices 804(1)-804(N) via one or more networks 808 (hereinafter, "the network 808").

The user device 804 may be operable by one or more users 806 to interact with the computer system 802. The user device 804 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), an onboard computer, a tablet computer, etc. For example, the user device 804(1) is illustrated as a desktop computer, while the user device 804(N) is illustrated as an example of a handheld mobile device.

The user device 804 may include a memory 814 and processor(s) 816. In the memory 814 may be stored program instructions that are loadable and executable on the processor(s) 816, as well as data generated during the execution of these programs. Depending on the configuration and type of user device 804, the memory 814 may be volatile (such as random access memory ("RAM")) and/or non-volatile (such as read-only memory (ROM), flash memory, etc.).

In some examples, the memory 814 may include a version of a model pipeline 810 (e.g., 810(1)). The model pipeline 810(1) may allow the user 806 to interact with the computer system 802 via the network 808. The user device 804 may also include one or more interfaces 818 to enable communication with other devices, systems, and the like. The model pipeline 810(1), whether embodied in the user device 804 or the computer system 802, may be configured to perform the techniques described herein. For example, the model pipeline 810 can include the components of the system 400 in FIG. 4. The model pipeline 810 can be used to generate modified motion plans based on robotic manipulator anomalies (e.g., object swinging, multiple object picks, missed object picks) detected in sensor data. In an example, the model pipeline 810 can include any other suitable devices, engines, modules, models, and the like.

Turning now to the details of the computer system 802, the computer system 802 may include one or more computer system computers, perhaps arranged in a cluster of servers or as a server farm, and may host web service applications. The function of the computer system 802 may be implemented a cloud-based environment such that individual components of the computer system 802 are virtual resources in a distributed environment.

The computer system 802 may include at least one memory 820 and one or more processing units (or processor (s)) 822. The processor 822 may be implemented as appropriate in hardware, computer-executable instructions, software, firmware, or combinations thereof. Computer-executable instruction, software, or firmware implementations of the processor 822 may include computer-executable or machine-executable instructions written in any suitable programming language to perform the various functions described. The memory 820 may include more than one memory and may be distributed throughout the computer system 802. The memory 820 may store program instructions that are loadable and executable on the processor(s) 822, as well as data generated during the execution of these programs. Depending on the configuration and type of memory including the computer system 802, the memory 820 may be volatile (such as RAM and/or non-volatile (such as read-only memory ("ROM"), flash memory, or other memory)). The memory 820 may include an operating system 824 and one or more application programs, modules, or services for implementing the features disclosed herein including at least a version of the model pipeline 810 (e.g., 810(2)). For example, the model pipeline 810(2) may perform the functionality described herein.

The computer system 802 may also include additional storage 828, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 828, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 802 and/or part of the computing system 106.

The computer system 802 may also include input/output (I/O) device(s) and/or ports 830, such as for enabling connection with a keyboard, a mouse, a pen, a voice input device, a touch input device, a display, speakers, a printer, or other I/O device.

In some examples, the computer system 802 may also include one or more user interface(s) 832. The user interface 832 may be utilized by an operator, curator, or other authorized user to access portions of the computer system 802. In some examples, the user interface 832 may include a graphical user interface, voice interfaces, web-based applications, programmatic interfaces such as APIs, or other user interface configurations.

The computer system 802 may also include a data store 801. In some examples, the data store 801 may include one or more databases, data structures, or the like for storing and/or retaining information associated with the computer system 802. The model pipeline 810 is communicatively coupled (e.g., via a wired connection or a wireless connection) to the data store 801. The data store 801 includes sensor data storage 834. In an example, the data store 801 can include any other suitable data, databases, libraries, and the like. The sensor data storage 834 can include images of robotic manipulators manipulating the position of objects.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

generating, based at least in part on first sensor data corresponding to a robotic manipulator manipulating an object and by at least using a machine learning model, a first segmentation of the object represented by the first sensor data, the first sensor data being received at a first time;

generating, based at least in part on second sensor data corresponding to the robotic manipulator manipulating the object and by at least using the machine learning model, a second segmentation of the object represented by the second sensor data, the second sensor data being received at a second time subsequent to the first time;

generating, based at least in part on an area of intersection between the first segmentation and the second segmentation, a swinging score indicating a degree of swinging of the object by the robotic manipulator;

updating a motion plan for the robotic manipulator manipulating the object based at least in part on the swinging score; and causing the robotic manipulator to execute the updated motion plan.

2. The computer-implemented method of claim 1, further comprising:

detecting, based at least in part on the first sensor data, a first fiducial position of one or more fiducial markers on the robotic manipulator at the first time; and detecting, based at least in part on the second sensor data, a second fiducial position of the one or more fiducial markers on the robotic manipulator at the second time.

3. The computer-implemented method of claim 2, further comprising:

aligning, based at least in part on the first fiducial position and the second fiducial position of the robotic manipulator, the first segmentation and the second segmentation, wherein the swinging score is further generated based at least in part on the alignment of the first segmentation and the second segmentation.

4. The computer-implemented method of claim 2, further comprising:

determining, based at least in part on the first fiducial position of the one or more fiducial markers, a first pose orientation of the robotic manipulator at the first time; and determining, based at least in part on the second fiducial position of the one or more fiducial markers, a second pose orientation of the robotic manipulator at the second time, wherein the swinging score is further generated based at least in part on the first pose orientation and the second pose orientation.

5. The computer-implemented method of claim 1, wherein the machine learning model is a first machine learning model, wherein the swinging score is generated by at least using a second model, and wherein the computer-implemented method further comprises, subsequent to updating the motion plan:

determining at least one of a success or a failure of manipulation of the object; and retraining the second model based at least in part on the success or the failure.

6. The computer-implemented method of claim 1, further comprising:

aligning, based at least in part on the first sensor data and the second sensor data, the first segmentation with respect to the second segmentation to determine the area of intersection between the first segmentation and the second segmentation.

7. The computer-implemented method of claim 1, further comprising:

determining that a value of the swinging score is below a predefined threshold, wherein updating the motion plan for the robotic manipulator further comprises terminating manipulation of the object responsive to determining that the value of the swinging score is below the predefined threshold.

8. The computer-implemented method of claim 1, wherein updating the motion plan further comprises generating a modified motion plan, and wherein the computer-implemented method further comprises:

automatically causing the robotic manipulator to execute the modified motion plan.

9. The computer-implemented method of claim 1, wherein the swinging score is a first swinging score, wherein the first sensor data and the second sensor data are received from a first sensor having a first sensor orientation with respect to the robotic manipulator, and wherein the computer-implemented method further comprises:

receiving, from a second sensor, third sensor data corresponding to the robotic manipulator manipulating the object at the first time, wherein the second sensor has a second sensor orientation with respect to the robotic manipulator that differs from the first sensor orientation;

receiving, from the second sensor, fourth sensor data corresponding to the robotic manipulator manipulating the object at the second time; and generating a second swinging score based at least in part on the third sensor data and the fourth sensor data, wherein the motion plan is further updated based at least in part on the second swinging score.

10. The computer-implemented method of claim 1, wherein updating the motion plan further comprises modifying a grasp orientation of the object by the robotic manipulator.

11. The computer-implemented method of claim 1, wherein updating the motion plan further comprises modifying an end destination for the object by the robotic manipulator.

12. The computer-implemented method of claim 1, wherein updating the motion plan further comprises modifying a movement speed of the robotic manipulator manipulating the object.

13. One or more non-transitory computer-readable media comprising computer-executable instructions that, when executed by one or more processing devices, cause the one or more processing devices to perform operations comprising:

generating, based at least in part on first sensor data corresponding to a robotic manipulator manipulating an object and by at least using a machine learning model, a first segmentation of the object represented by the first sensor data, the first sensor data being received at a first time;

generating, based at least in part on second sensor data corresponding to the robotic manipulator manipulating the object and by at least using the machine learning model, a second segmentation of the object represented by the second sensor data, the second sensor data being received at a second time subsequent to the first time;

generating, based at least in part on an area of intersection between the first segmentation and the second segmentation, a swinging score indicating a degree of swinging of the object by the robotic manipulator;

updating a motion plan for the robotic manipulator manipulating the object based at least in part on the swinging score; and causing the robotic manipulator to execute the updated motion plan.

14. The one or more non-transitory computer-readable media of claim 13, wherein the operations further comprise:

detecting, based at least in part on the first sensor data, a first fiducial position of one or more fiducial markers on the robotic manipulator at the first time; and detecting, based at least in part on the second sensor data, a second fiducial position of the one or more fiducial markers on the robotic manipulator at the second time.

15. The one or more non-transitory computer-readable media of claim 14, wherein the operations further comprise:

performing, based at least in part on the first fiducial position and the second fiducial position of the one or more fiducial markers, at least one of scaling, translation, or rotation of the second sensor data to align a position of the second segmentation with respect to the first segmentation, wherein the swinging score is further generated based at least in part on aligning the position of the second segmentation with respect to the first segmentation.

16. The one or more non-transitory computer-readable media of claim 13, wherein the operations further comprise:

determining that the swinging score is below a predefined threshold; and responsive to determining that the swinging score is below the predefined threshold, preventing the robotic manipulator from performing further manipulation of the object.

17. A system, comprising:

a robotic manipulator;

an image sensor configured to capture image data of the robotic manipulator moving packages from a first location to a second location;

a processing device; and a non-transitory memory device configured to store instructions that are executable by the processing device for causing the processing device to:

receive, from the image sensor at a first time, first image data representing the robotic manipulator moving a package from the first location as part of a movement operation;

receive, from the image sensor at a second time subsequent to the first time, second image data representing the robotic manipulator moving the package toward the second location as part of the movement operation;

generate, by at least using a first machine learning model, a first segmentation of the package in the first image data;

generate, by at least using the first machine learning model, a second segmentation of the package in the second image data;

generate, by at least using a second model and based at least in part on an area of intersection between the first segmentation and the second segmentation, a swinging score indicating a degree of swinging of the package by the robotic manipulator during the movement operation;

modify an initial motion plan for the movement operation to define a modified motion plan based at least in part on the swinging score; and cause the robotic manipulator to execute the modified motion plan for the movement operation.

18. The system of claim 17, wherein the initial motion plan comprises moving the package at a first speed, and wherein the non-transitory memory device is further configured to store instructions that are executable by the processing device for causing the robotic manipulator to execute the modified motion plan by at least:

causing the robotic manipulator to place the package back at the first location; and causing the robotic manipulator to grasp and move the package from the first location to the second location at a second speed that is lower than the first speed.

19. The system of claim 17, wherein the initial motion plan comprises the robotic manipulator grasping the package at a first orientation of the package, and wherein the non-transitory memory device is further configured to store instructions that are executable by the processing device for causing the robotic manipulator to execute the modified motion plan by at least:

causing the robotic manipulator to place the package back at the first location; and causing the robotic manipulator to grasp the package at a second orientation of the package at the first location to move the package to the second location, wherein the second orientation differs from the first orientation.

20. The system of claim 17, wherein the non-transitory memory device is further configured to store instructions that are executable by the processing device for causing the processing device to:

determine that the swinging score is below a predefined threshold, wherein causing the robotic manipulator to execute the modified motion plan for the movement operation further comprises causing the robotic manipulator to terminate the movement operation.

* * * * *